Patented Dec. 25, 1928.

1,696,874

UNITED STATES PATENT OFFICE.

CHARLES O. YOUNG, OF ELMHURST, NEW YORK, ASSIGNOR TO CARBIDE & CARBON CHEMICAL CORPORATION, A CORPORATION OF NEW YORK.

PROCESS OF MAKING ETHYLENE GLYCOL MONOALKYL ETHERS.

No Drawing. Application filed February 7, 1924. Serial No. 691,283.

The invention is a process of preparing ethylene glycol monoalkyl ethers by a reaction involving ethylene oxid and an alcohol.

Prior methods of making ethylene glycol monoalkyl ethers have ordinarily necessitated the use of metallic sodium. For example, sodium ethylene glycollate is produced by acting upon ethylene glycol with metallic sodium, and the glycollate, heated with ethyl iodid, yields the glycol ether. While such processes are satisfactory for laboratory use, they are not adapted for commercial work. So far as I am aware no attempt has been made to prepare the product in large quantities and its industrial possibilities have not been investigated.

According to the present invention, an efficient, simplified process is provided. In a preferred form it comprises an addition reaction between ethylene oxid and ethyl alcohol, under regulated conditions of temperature and pressure.

The process may be carried out as follows: Ethylene oxid and ethyl alcohol preferably absolute are mixed in an autoclave at a temperature below the boiling point of the mixture. The autoclave is then sealed and heated to a temperature which may vary between 100 and 300° C. Heating to 150° C. for about 12 hours is satisfactory. The time of heating may be reduced to three or four hours by raising the temperature to about 200° C. The reaction which takes place may be represented in part by the following equation:

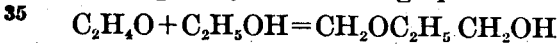

The alcohol may advantageously be in considerable excess. Water should be excluded, so far as possible, to obtain the best yields and avoid difficulty in obtaining the product in anhydrous condition.

I have discovered that good yields of ethylene glycol monoethyl ether are obtained only when the reaction mixture is subjected to temperatures corresponding to considerable pressures, which may be of the order of 100 to 600 lbs. per square inch. When heating in an autoclave at about 150° C., as described above, is adopted, the pressure may rise to 250 lbs. or more at the beginning of the reaction. Toward the end it falls to about half that amount. With more vigorous heating the pressure is correspondingly raised.

In this as in most chemical reactions temperature and time are co-related factors, wherefore the operation can be carried out at lower temperatures than those mentioned above by sufficiently extending the time.

The product is fractionally distilled to separate the glycol ether (b. p. about 134° C.) from unused ethylene oxid, alcohol, and the high boiling reaction products such as the ethyl ethers of the di- and triethylene glycols, which are ordinarily formed to a certain extent. The ethylene oxid and alcohol may be returned to the process. The yield of glycol ether, computed on the basis of the alcohol which reacts, is 70% or more of the theoretical, under usual conditions.

The present invention provides a practical method of obtaining good yields of ethylene glycol monoethyl ether by the reaction of ethylene oxid and alcohol. So far as I am aware, this is a result new in the art, although it has long been known that these compounds are capable of the additive reaction described. The discovery of optimum reaction conditions is covered by the appended claim, together with such modifications of the process as may be made without departure from the general inventive idea.

I claim:

Process of making ethylene glycol monoethyl ether, comprising effecting a reaction between ethylene oxid and ethyl alcohol by means of heat and pressure in the presence of a large excess of alcohol.

In testimony whereof, I affix my signature.

CHARLES O. YOUNG.